US006312632B1

(12) United States Patent
Graf

(10) Patent No.: US 6,312,632 B1
(45) Date of Patent: Nov. 6, 2001

(54) PROCESS FOR THE PRODUCTION OF WOOD-BASED BOARDS HAVING STRUCTURED SURFACES

(75) Inventor: Matthias Graf, Rocky Mountain House (CA)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 0 days.

(21) Appl. No.: 09/071,773

(22) Filed: May 4, 1998

(30) Foreign Application Priority Data

May 3, 1997 (DE) .............................................. 197 18 771

(51) Int. Cl.[7] ........................... B29C 43/46; B29C 43/52; B29C 59/04; B29C 70/16; B29C 70/50

(52) U.S. Cl. .......................... 264/119; 264/123; 264/125; 264/134

(58) Field of Search .................................... 264/109, 112, 264/280, 119, 125, 122, 123, 134, 128; 156/583.5, 583.3, 296, 555, 196, 219

(56) References Cited

U.S. PATENT DOCUMENTS 3,483,057 * 12/1969 Mittman ............................... 156/209
4,007,076 * 2/1977 Clarke et al. ........................ 156/62.8
4,007,767 * 2/1977 Colledge .............................. 144/328
4,073,672 * 2/1978 Clarke et al. ........................ 156/219
4,104,429 * 8/1978 Colledge .............................. 428/151
4,221,758 * 9/1980 Burkey et al. ........................ 264/225
5,008,057 * 4/1991 Risius et al. ......................... 264/134
5,322,577 * 6/1994 Greten et al. ........................ 156/62.2
5,498,309 * 3/1996 Greten et al. ........................ 156/347
5,538,676 * 7/1996 Bielfeldt ............................... 264/109
5,643,376 * 7/1997 Gerhardt et al. .................... 156/62.2
5,779,955 * 7/1998 Siempelkamp ........................ 264/109
5,902,442 * 5/1999 Phillips et al. ....................... 156/296
5,932,156 * 8/1999 Eriksson et al. ..................... 264/109
5,972,266 * 10/1999 Fookes et al. ....................... 264/122

FOREIGN PATENT DOCUMENTS 614 666 12/1979 (CH) .
1 922 575 * 11/1970 (DE) .
41 37 845 * 5/1993 (DE) .
41 40 982 6/1993 (DE) .
43 33 614 4/1995 (DE) .
0 371 371 6/1990 (EP) .
0 710 533 * 5/1996 (EP) .

* cited by examiner

*Primary Examiner*—Angela Ortiz
(74) *Attorney, Agent, or Firm*—Foley & Lardner

(57) ABSTRACT

The process relates to the production of boards of wood-based material, in particular, oriented strand board, chipboard or fiberboard comprising lignocellulose- and/or cellulose-containing particles. The particles, in the form of chips, fibers, chippings or the like, are mixed with a binder and scattered in a scattering station onto a moving molding belt to form a mat of pressed stock. The mat of pressed stock is pressed and cured by the application of pressure and heat in a platen press or a continuously operating press. To accomplish surface structuring during the production cycle, the finished board of wood-based material just released from the pressing operation is subjected to a structuring operation on one or both sides.

5 Claims, 1 Drawing Sheet

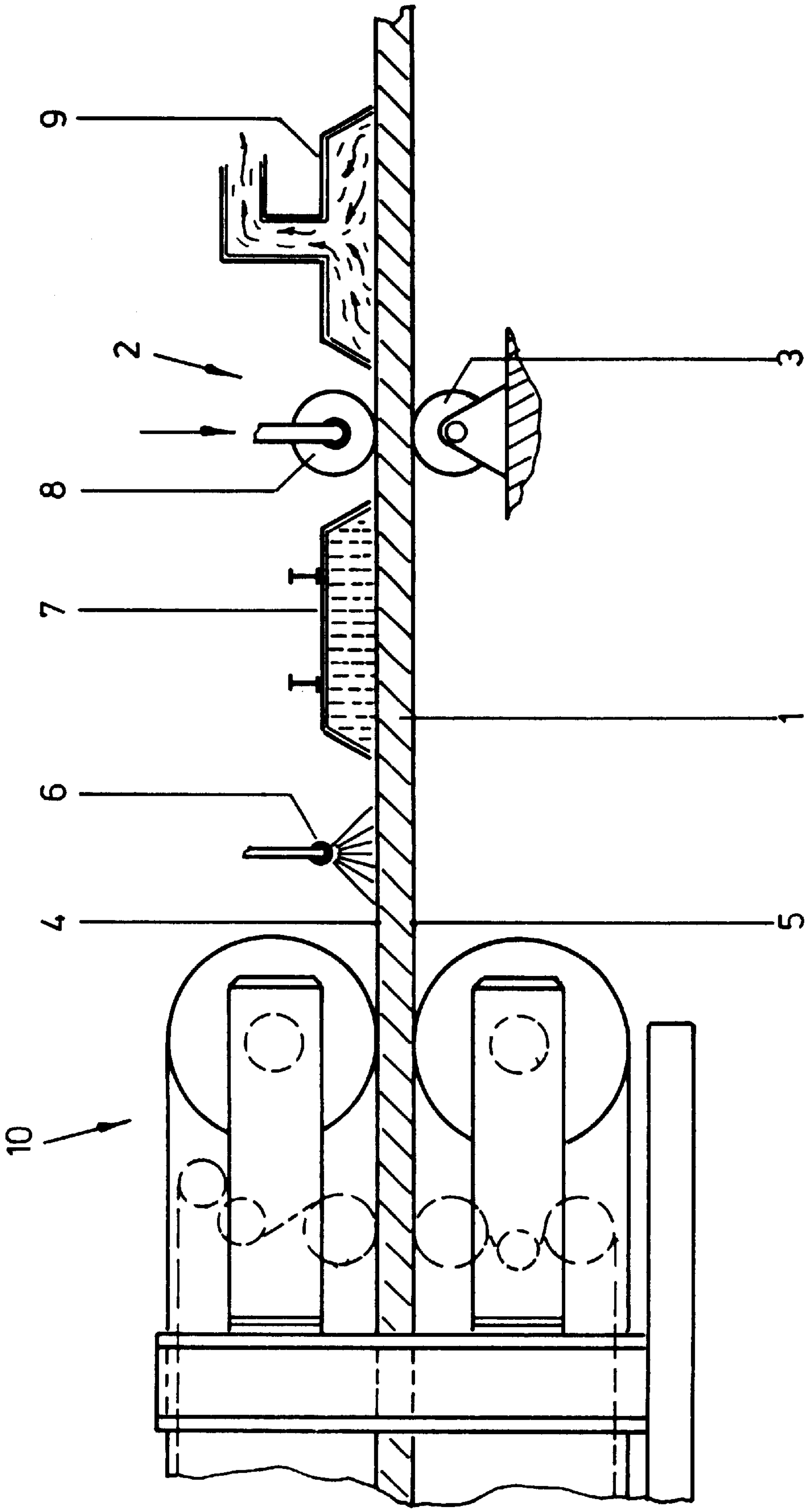
9
2
8
7
6
4
10
3
1
5

PROCESS FOR THE PRODUCTION OF WOOD-BASED BOARDS HAVING STRUCTURED SURFACES

BACKGROUND OF THE INVENTION

1. Field of the Invention

The present invention relates to a process and an installation for producing boards of wood-based material.

In particular, the present invention concerns the optional production of structured surfaces on boards of wood-based material—preferably OSB (oriented stranded boards) boards—which are produced by single platen or multi-platen presses or by continuously operating presses.

2. Description of Related Art

It is known to structure one side of OSB boards for achieving better adhesion properties in the case of roof sheeting used in prefabricated house construction. In this case, OSB boards with structuring on one side are produced on single platen or multi-platen presses by scattering chippings onto metal mesh mats or perforated transporting plates. The metal mesh mats correspond to the geometric size of the respective pressing/heating platen of the single or multi-platen press. In the case of single platen or multi-platen systems, a metal mesh belt or perforated transporting plate has two functions: first, the metal mesh belt is used to transport the pressed stock to a respective level between the pressing/heating platen(s) of the press and also to remove it again as a finished board of wood-based material, and second, the mesh structure of this metal mesh belt (transporting mat) is used for producing the structuring on the surface of the OSB board during the pressing operation. The later being accomplished by making use of the plasticity of the heated wood-based material which occurs automatically due to the vaporization in the press of the moisture introduced with the pressed stock.

Surface structuring for boards of wood-based material is also known with a continuously operating press according to German Patent No. 43 33 614. A metal mesh belt is made to circulate around the lower pressing/heating platen and, as in the case of the application in platen presses, is used as a transporting and structuring belt. This patent is primarily directed to the advantages of a preheating zone, however, structuring of the board of wood-based material is also produced during the continuous pressing operation. The plasticity of the board of wood-based material caused during the pressing operation being made use of in the same way as discussed above with regard to single platen or multi-platen presses.

Disadvantages of both press arrangements arise due to the combination of the two functions: transporting and simultaneous structuring.

Optional pressing with smooth surfaces on both sides is possible only with considerable effort by changing over the charging devices. In the case of single platen or multi-platen presses, smooth plates have to be exchanged for the metal mesh belts. In the case of a continuously operating press, the endlessly circulating metal mesh belt would have to be replaced with by a smooth belt, or entirely eliminated such that transfer of the pressed stock directly into the press would be performed by the transfer belts. For these reasons, such change-overs cannot be carried out cost-effectively. Further, this negatively affects contemporary "just-in-time" production processes due to the long inactive times between producing boards of wood-based material with a smooth surface and with structuring on one or both sides.

An alternative solution is to subsequently structure finished, cooled-down boards of wood-based material. However, this leads to reductions in the flexural strength of the board and the adhesiveness on these structured surfaces.

SUMMARY OF THE INVENTION

An object of the present invention is to provide a process and apparatus that overcomes the disadvantages of known press arrangements by producing without interruption, boards of wood-based material with either smooth or structured surfaces, and without adversely affecting the mechanical strength properties of the boards and the adhesiveness on the structured side.

In accomplishing the foregoing object, there is provided according to the present invention a process for producing boards of wood-based material containing particles of lignocellulose- and/or cellulose-containing particles mixed with a binder. The process comprises scattering the particles from a scattering station onto a moving molding belt to form a mat of pressed stock; transferring the mat of pressed stock into a press, the press pressing and curing the mat of pressed stock by the application of pressure and heat to finish the board of wood-based material; and subjecting the finished board of wood-based material to a structuring operation on at least one of its major sides. In one preferred embodiment, the finished board of wood-based material has sufficient plasticity entering the structuring operation so as to be structured without adversely affecting flexural strength.

In accomplishing the foregoing object, there is also provided according to the present invention an installation for producing boards of wood-based material containing particles of lignocellulose- and/or cellulose-containing particles mixed with a binder. The installation comprises a scattering station adapted for scattering the particles onto a moving molding belt to form a mat of pressed stock; a press adapted for pressing and curing the mat of pressed stock by the application of pressure and heat to finish the board of wood-based material; and a structuring roller frame supporting at least one roller adapted for impressing at least one major surface of the finished board of wood-based material. In one preferred embodiment, the finished board has sufficient plasticity entering the structuring roller frame so as to be structured by the at least one roller without adversely affecting flexural strength of the impressed board of wood-based material.

Conventionally, OSB was provided with structured surfaces for use in prefabricated house construction. The structuring process technology according to the present invention opens up certain niche markets including using chipboards having the structured surfaces used in prefabricated house construction, or using MDF boards to provide artistically styled design surfaces.

Additional objects, features and advantages of the invention will be set forth in the description which follows, and in part will be obvious from the description, or may be learned by practice of the invention.

BRIEF DESCRIPTION OF THE DRAWING

The accompanying drawing, which is incorporated in and constitutes a part of the specification, illustrates a presently preferred embodiment of the invention, and, together with the general description given above and the detailed description of the preferred embodiment given below, serves to explain the principles of the invention.

The drawing FIGURE shows an installation according to the present invention for carrying out the process according to the present invention.

DETAILED DESCRIPTION OF THE PREFERRED EMBODIMENTS

An advantage of the process according to the invention is that in the case of cycle-dependent single platen and multi-platen presses, as well as the case of a continuously operating press, a structuring process following directly after the run-out can be optionally activated for the production of structured surfaces. Consequently, the heat still stored in the freshly pressed board of wood-based material provides adequate plasticity that can be used for surface structuring before the board of wood-based material is sent for cooling and post-drying (storing).

An advantage of installations according to the present invention is that the direct arrangement of the structuring roller frame at the run-out of a continuously operating press uses the heat still accumulated in the board of wood-based material and the increased moisture in the core of the board of wood-based material. For example, when the core temperature in the center of the board of wood-based material is slightly below 120° Celsius and the temperature on the surface is over 150° Celsius, and the degree of moisture in the core of the board is about 1% to 2% higher than after the post-drying and cooling zone. Thus, such a board still has adequate plasticity for the structuring process according to the present invention.

In the case of some methods and production processes, the board of wood-based material does not leave the press at an adequate temperature to achieve optimum structuring. According to the present invention, it is possible to compensate for this disadvantage before commencing the structuring operation by spraying water onto the surfaces of the board of wood-based material. The applied moisture subsequently vaporizes, with the application of additional heat if need be, so that there is adequate plasticity at the surfaces to be structured. Preferably, radiation systems such as microwave or infrared heaters can provide the additional heating during vaporization.

Installations according to the present invention include various advantageous embodiments in the direct vicinity of the board run-out. For example, from a continuously operating press, only a structuring roller is required if the plasticity of the outer layers is adequate for structuring. In a second exemplary embodiment, an additional water spraying device continuously sweeps transversely over the surface(s) of the board of wood-based material to be structured. A collection steam hood may be arranged directly thereafter in situations where the water sprayed on the surface vaporizes immediately due to the existing or induced high surface temperature of about 150° Celsius. In a third exemplary embodiment, the steam hood is additionally equipped with a heater, such as a microwave or infrared heating device. Given adequate plasticity, the structuring roller forms a relief pattern or structure similar to that formed by the metal mesh belt according to the prior art. However, an advantage of the present invention is that, in addition to the surface structure having the same adhering properties as can be produced according to the prior art, the flexural strength is not adversely affected in comparison with conventional cold structuring processes.

Another advantage of the present invention over conventional mesh belts and perforated plates used for producing a single structured surface during conventional pressing operations, is that by simply exchanging the structuring roller, any desired surface structures can be produced for obtaining the desired adhesion properties or desired joining technique to a surface to be applied later. For example, a roller producing a particular studded structure to be used in a press-stud joining technique can be exchanged with a structuring roller producing strips of smooth surfaces and structured surfaces alternating in the transporting direction. For surface structuring on only one side of the board of wood-based material, providing a post-drying zone after the structuring roller frame may be advantageous for specifically countering any possibly occurring one-sided distortion of the board of wood-based material. Radiation such as microwave or infrared, or hot air may be used in the post drying zone.

Turning now to the drawing, a continuously operating press 10 has been chosen for explanation purposes, however, the present invention may also be practiced in connection with other types of presses. According to the exemplary illustrated embodiment, a finished board 1 of wood-based material is just coming out of the continuously operating press 10. An upper surface 4 of the board 1 of wood-based material is structured in an impressing manner as it passes through a structuring roller frame 2. A structuring roller 8 is pressed toward the mating roller 3 so as to impress in the upper surface 4 a specifically selected relief pattern present on the structuring roller 8. If the lower surface 5 of the board 1 of wood-based material is also to be provided with structuring, the mating roller 3 may also be provided with a raised pattern.

If the board 1 of wood-based material does not leave the continuously operating press 10 at an adequate temperature, that is to say it no longer has adequate plasticity for the optional structuring, the board 1 of wood-based material is advantageously sprayed with hot water on one or both surfaces 4 and/or 5 by a water spraying device 6 (only surface 4 is shown being sprayed). The board 1 may then pass through a vaporizing zone, designed as a steam hood 7, before it goes through the structuring roller frame 2. To achieve even greater plasticity of the upper layers of the board 1 of wood-based material, the steam hood 7 may include a heater. According to a preferred embodiment of the present invention, either a microwave or an infrared heater are used in the steam hood 7.

If need be, the installation is also provided after the structuring roller frame 2 with a cooling and post-drying device 9. For easier and deeper structuring, the structuring roller 8 may be arranged in the structuring roller frame 2 such that it is operated in a vertically oscillating or pulsating manner.

Additional advantages and modifications will readily occur to those skilled in the art. Therefore, the invention in its broader aspects is not limited to the specific details, and representative devices, shown and described herein. Accordingly, various modifications may be made without departing from the spirit and scope of the general inventive concept as defined by the appended claims and their equivalents.

The priority document, German Patent Application No. 197 18 771.4, filed May 3, 1997, is hereby incorporated by reference.

What is claimed is:

1. A process for producing a board of wood-based material containing particles of lignocellulose, cellulose, or a combination of lignocellulose and cellulose, the particles being mixed with a binder, the process comprising:

scattering the particles to a form a mat;

transferring the mat into a press;

pressing and curing the mat in the press by the application of pressure and heat to finish the board of wood-based material; and subjecting a just-finished board to a structuring operation on at least one of its surfaces wherein the just-finished board is still hot from the pressing and curing step when it is subjected to the structuring operation.

2. The process as claimed in claim 1, wherein the just-finished board has sufficient plasticity entering said structuring operation so as to be structured without adversely affecting flexural strength.

3. The process as claimed in claim 1, further comprising before said structuring operation:

spraying water on at least one of the surfaces of the just-finished board released; and then passing the board through either a heated or unheated vaporizing zone.

4. The process as claimed in claim 1, further comprising:

cooling and post-drying the just-finished board after said structuring operation.

5. A process for producing boards of wood-based material containing particles of lignocellulose, cellulose, or a combination of lignocellulose and cellulose, the particles being mixed with a binder, the process comprising:

scattering the particles to form a mat;

transferring the mat into a press;

pressing and curing the mat in the press by the application of pressure and heat to finish the boards of wood-based material to form just-finished boards having surfaces; and subjecting some of the just-finished boards to a structuring operation on at least one of the surfaces, while refraining from subjecting others of the just-finished boards to the structuring operation, wherein said some of the just-finished boards are still hot from the pressing and curing step when they are subjected to the structuring operation.

* * * * *